United States Patent [19]

Strickman et al.

[11] 4,421,526
[45] Dec. 20, 1983

[54] POLYURETHANE FOAM CLEANING PADS AND A PROCESS FOR THEIR MANUFACTURE

[75] Inventors: Robert L. Strickman; Melvyn B. Strickman, both of Bridgeton, N.J.

[73] Assignee: Sherwood Research and Development Partnership, Englewood Cliffs, N.J.

[21] Appl. No.: 955,877

[22] Filed: Oct. 30, 1978

Related U.S. Application Data

[63] Continuation-in-part of Ser. No. 305,870, Nov. 13, 1972, abandoned.

[51] Int. Cl.³ .............. B29D 27/04; C11D 17/04; B24D 3/32
[52] U.S. Cl. .................. 51/296; 15/104.93; 51/307; 264/45.3; 264/46.2; 264/54
[58] Field of Search .......... 51/295, 296, 298, 307; 264/45.3, 54, DIG. 7; 425/321, 115; 521/905, 917; 15/104.93

[56] References Cited

U.S. PATENT DOCUMENTS

| | | | |
|---|---|---|---|
| 3,002,937 | 10/1961 | Parker et al. | 521/120 X |
| 3,012,977 | 12/1961 | Wilson et al. | 51/298 X |
| 3,056,168 | 10/1962 | Terry | 264/54 X |
| 3,073,716 | 1/1963 | Gilchrist | 51/295 |
| 3,165,418 | 1/1965 | Jenkins et al. | 51/296 |
| 3,177,055 | 4/1965 | Ruckle | 51/296 |
| 3,252,775 | 5/1966 | Tocci-Gullbert | 264/54 X |
| 3,256,218 | 6/1966 | Knox | 264/54 X |
| 3,377,151 | 4/1968 | Lanham | 51/296 |
| 3,377,411 | 4/1968 | Charvat | 264/45.3 |
| 3,401,128 | 9/1968 | Terry | 264/DIG. 7 |
| 3,401,490 | 9/1968 | Mora | 51/295 |
| 3,414,928 | 12/1968 | Lemelson | 51/295 |
| 3,452,122 | 6/1969 | Stern et al. | 264/DIG. 7 |
| 3,492,192 | 1/1970 | Bullard | 264/45.3 X |
| 3,529,945 | 9/1970 | Charvat | 51/296 |
| 3,547,608 | 12/1970 | Kitazawa | 51/294 |
| 3,601,848 | 8/1971 | Zippel | 425/115 |
| 3,619,843 | 11/1971 | Richter et al. | 51/295 |
| 3,736,089 | 5/1973 | Ross et al. | 425/371 X |
| 3,833,386 | 9/1974 | Wood et al. | 264/44 X |
| 3,850,589 | 11/1974 | Charvat | 51/296 |
| 3,918,220 | 11/1975 | Jury et al. | 51/296 X |
| 4,038,047 | 7/1977 | Haywood | 51/296 |
| 4,124,518 | 11/1978 | Stone et al. | 15/104.93 X |
| 4,127,515 | 11/1978 | MacRae | 521/905 X |
| 4,160,076 | 7/1979 | Guthrie et al. | 521/905 X |
| 4,193,887 | 3/1980 | Stone et al. | 428/160 X |

FOREIGN PATENT DOCUMENTS

| | | | |
|---|---|---|---|
| 2601156 | 7/1976 | Fed. Rep. of Germany | 264/45.3 |
| 51-66362 | 6/1976 | Japan | 264/45.3 |
| 55-44890 | 3/1980 | Japan | 264/45.3 |

OTHER PUBLICATIONS

Webster's New Collegiate Dictionary, Springfield, Mass., G. & C. Merriam Co., ©1961, pp. 268-418.

Primary Examiner—Philip E. Anderson
Attorney, Agent, or Firm—Duffield & Lehrer

[57] ABSTRACT

This invention relates to dry, dense, hydrophilic polyurethane foam cleaning pads containing abrasives, detergents and combinations thereof dispersed integrally therein as well as to a method of manufacturing these pads. The pads' surfaces are strengthened by the densification of the reacting prepolymer resin during manufacture, and preferably the pads have at least one surface textured for additional cleaning area. The surfaces can contain an optional additional layer of abrasives to obtain a greater durability and a more desirable scouring action.

22 Claims, 3 Drawing Figures

POLYURETHANE FOAM CLEANING PADS AND A PROCESS FOR THEIR MANUFACTURE

CROSS REFERENCE TO EXISTING APPLICATION

This application is a continuation-in-part of copending application Ser. No. 305,870, filed Nov. 13, 1972 now abandoned.

BACKGROUND OF THE INVENTION

Various cleaning sponges have been developed incorporating a scrubbing surface within a polyurethane or other polymeric sponge. U.S. Pat. No. 3,414,928 issued to Lemelson shows a sponge containing plastic or wire wool embedded into the surface of a polyurethane or polyacetate sponge; U.S. Pat. No. 3,570,036 issued to Gilchrist shows a multiple layer polyurethane sponge, the surface layers comprised of alternating polyurethane laminar strips of differing textures. These sponges contain neither a particulate abrasive nor a detergent integral to the cellular matrix of the polymeric material. Similarly, British Pat. No. 955,713 discloses a layered sponge, one layer consisting of a steel wool abrasive surface. Richter U.S. Pat. No. 3,810,841 demonstrates that at least some abrasives as well as other additives, such as soaps and detergents, may be incorporated integrally into a polyurethane sponge having at least one reticulated layer for egress of additives. However, Richter's sponge not only has a different cellular structure than the product disclosed herein, but is produced by an altogether different procedure. Richter's sponge is to be used once for a surgical scrub; heavy duty use such as scouring kitchen utensils and appliances is neither contemplated nor practical.

A strong, long-lasting, resilient polyurethane cleaning pad preferably should have a scouring abrasive concentrated near the surface, and the scouring surface should be textured to increase the active scouring area thereby reducing time and effort expended during cleaning. Unfortunately, a textured surface that increases active scouring area necessarily decreases strength, especially along the walls of the adjacent indentations. However, the pads of the present invention can be textured easily without overly sacrificing strength and permit the incorporation of abrasive at the surface in a manner that strengthens the walls of adjacent indentations. Furthermore, the pads of the present invention may also incorporate ample quantities of a detergent and other additives so that pad may be used many times before the supply of additives is exhausted.

SUMMARY OF THE INVENTION

A uniform reacting mixture of prepolymer resin, catalyst, abrasive and other additives is prepared in a two step mixing process. First, a prepolymer and catalyst are mixed in the proper manner until a creamy, partially reacted polymeric mass is obtained. Then, before the mass has had a chance to actively foam, a previously prepared mixture of the desired additives is admixed under controlled conditions to obtain a uniform reacting mixture. This mixture is then poured onto a first mold whose surface has been dusted optionally with a layer of additional abrasive, and allowed to expand in contact with a second mold thereby pressuring the polyurethane foam between the two molds. The molding operation may be performed continuously by a pair of conveyors, the belts of which comprise the surface at which the pads are molded.

It is an object of this invention to provide a dry, dense, hydrophilic polyurethane foam cleaning pad having a particulate abrasive or a detergent dispersed integrally within the cellular structure of the pad.

It is a primary object of this invention to provide a dry, dense, hydrophilic polyurethane foam cleaning pad having both an abrasive and a detergent dispersed integrally within the cellular structure of the pad.

It is a further object of this invention to provide a dry, dense, hydrophilic polyurethane foam cleaning pad into whose surface an abrasive has been incorporated.

It is also an object of this invention to provide a dry, dense, hydrophilic polyurethane foam cleaning pad having a surface textured to increase the scouring area, yet retaining the strength of the pad.

An additional object is to permit the addition of cleaning agents, fragrances, dyes, and other additives.

Another object of this invention is to provide a pad containing oxygen, chlorine and ammonia releasing agents that are released gradually upon wetting.

A further object of the invention is to provide a method whereby the pad may be manufactured.

Another object is to provide a method of continuous manufacture.

Other objects and advantages of this invention will be apparent from the description of the preferred embodiment.

DESCRIPTION OF THE PREFERRED EMBODIMENT

Figure 1:
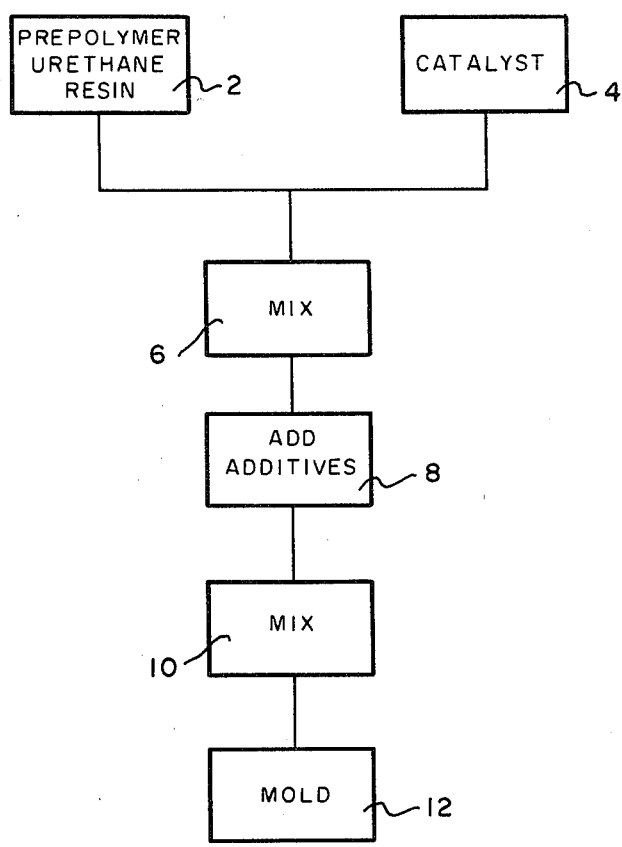
FIG. 1 is a flowchart illustrating a method of producing polyurethane cleaning pads according to the present invention.

The initial step in manufacture is to prepare a partially polymerized mass to which an abrasive as well as other additives can be added. As illustrated in FIG. 1, the polymeric mass is prepared by mixing at 20° to 25° C. 15 to 50 parts of a commercially available prepolymer urethane resin 2 such as F-202 manufactured by Stepan Chemical Company with each part of a catalyst 4 comprised by weight anaylsis of 10 to 15% triethylenediamine, 18 to 22% triethanolamine, and 60 to 70% water. It is equally possible to prepare the prepolymer resin from polypropylene glycol and toluene diisocyanate according to known technology. Regardless of source, the prepolymer resin to be used in the production of pads of the present invention should have a Brookfield viscosity at 25° C. between 5000 and 15000 cps., preferably between 7200 and 9400, an isocyanate content (NCO) between 6 and 12%, a hydroxyl number between 40 and 80, preferably between 50 and 60, and a molecular weight of the polyol component between 1800 and 4000. These foam making materials are stirred at step 6 in FIG. 1 at 500 to 2500 RPM for 30 to 100 seconds at which time the viscosity of the polymeric mass is sufficiently greater to allow for the incorporation of additives. We are also able to prepare the polymeric mass directly from prepolymer precursors and catalyst by using the procedure generally designated as the "one-step" method and incorporating our mixing methods during the final stages of that procedure. Although the reaction has been initiated, the reactants have not yet actively foamed apparently because the low mixing speed together with the prolonged duration of mixing hinders the formation of foam by dissipating evolved gases. A properly prepared polymeric mass has a creamy consistency and evidences little foaming. Prior to volumetric expansion of the reactants, a mixture of the additives is added at 8 and dispersed uniformly within the polymeric mass by gentle mixing at 10 for 30 to 100 seconds at 250 to 750 RPM to obtain a uniform reacting mixture. Again, gases evolved by the reaction and which normally cause foaming are dissipated by continued agitation to further retard foam formation and volumetric expansion.

The various constituents that may be added to the pad are abrasives, detergents, fragrances, dyes, sanitizers, polishing agents, or ammonia, oxygen, and chlorine releasing agents. We have found that the particle size of the additives is not critical, and is quite broad. Thus, additives can have a particle size up to No. 3 U.S. Standard Sieve and still be dissolved and dispersed upon use. The range of particles that can be incorporated within the cellular matrix is between No. 3 and No. 170 U.S. Standard Sieve, although 40 to 100 mesh is preferred.

The abrasives and detergents are primary constituents and the relative proportions of each depend on the type of pad desired. Thus, a pad containing only abrasive can be used for tasks for which one would generally use steel wool. Conversely, a detergent pad may be used for cleaning easily scratched surfaces such as Teflon coated utensils. A combination pad containing both abrasives and detergents can be used for general purpose cleaning. Using the procedure described above, it is possible to disperse in the polymeric mass between 0.25 and 2.0 grams of abrasive and detergent in proportions between 0 and 100% for each gram of prepolymer resin. Preferably, however, this ratio is between 0.50 and 1.50 grams per gram of resin.

Pumice is the preferred abrasive because it breaks down by mechanical action, thus tending to polish rather than scratch the scoured article. However, aluminum oxide, volcanic ash and silica are also suitable. The preferred detergent is a linear alkylaryl sulfonate which includes commercially available Ultrawet K and Sulframin 85. Sodium sulfo succinate ester detergents such as Emcol 4300 may also be used, but are not preferred. Because detergents also act as surfactants, it is unnecessary to add a cell modifier to the polymeric mass when detergents are incorporated therein. However, a detergentless pad requires the addition of approximately 0.50 grams of a cell modifier such as polydimethylsiloxane per 100 grams of the prepolymer resin.

The other (secondary) additives are added to enhance the usefulness of the product. These constituents and agents are premixed with the abrasive and/or detergent, said mixture added to the prepolymer-catalyst mixture subsequent to the initial reaction, but before volumetric expansion begins. Where a particular agent, such as the ammonia releasing agent, is comprised of two or more constituents, it is preferable to mix them before admixture with the abrasive and other additives. A typical ammonia releasing agent is a mixture of ammonia chloride and a basic compound such as sodium carbonate in the ratio of 2.5:1. Ammonium hydroxide is released upon hydrolysis according to the reaction:

$$NH_4Cl + Na_2CO_3 + H_2O \rightarrow NH_4OH + NaCl + NaHCO_3.$$

Sodium perborate is used to release oxygen and/or hydrogen peroxide and may be used in conjunction with borax detergent. A chlorine releasing agent can be formulated by mixing sodium carbonate and sodium dichloro-s-triazinetrione dihydrate in a typical ratio of 12.5:1.

Figure 2:
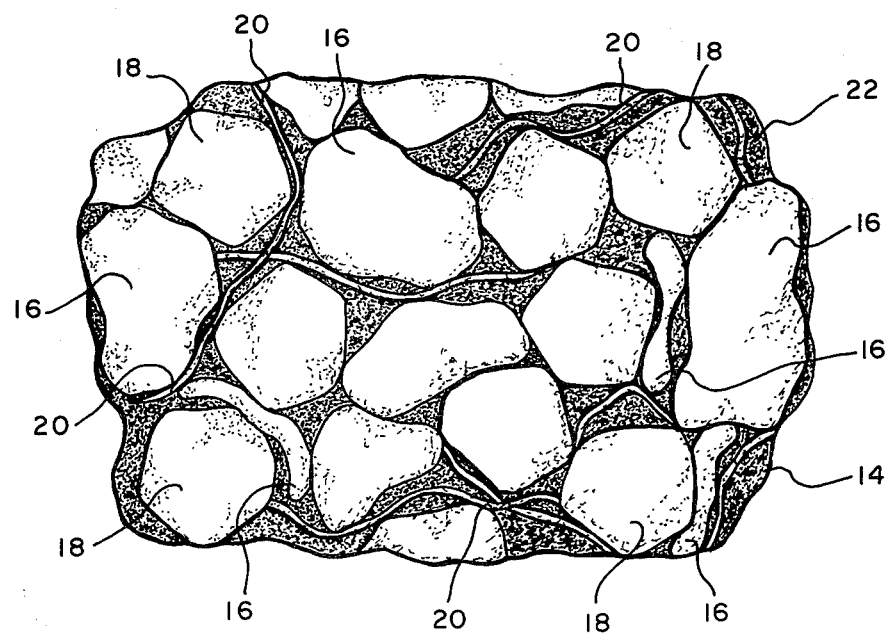
FIG. 2 is a cross-sectional view of a finished pad.

The two step mixing procedure is a marked departure from conventional polyurethane foam technology and produces pads that have both unique structure and novel properties. By initially mixing the foam making materials as described, large quantities of additives can be suspended within the polymeric mass obtained by partial polymerization. Even large quantities of detergents, which are also surfactants and which would normally interfere with the foam making reactions, can be incorporated into the cellular matrix in this manner. As indicated above normal foam formation is retarded during the mixing steps. By suppressing foam formation a finished product 14 shown in FIG. 2 having a significant quantity of collapsed, ruptured and distorted cells 16 as well as normal cells 18 is produced. Interwoven through the cellular structure are fibrous strands 20 and threads produced by the shear forces of mixing. The pads produced according to this invention are three to five times as dense as normally produced polyurethane sponges, and are, surprisingly, hydrophilic in nature. Thus, we have found that our pads are capable of absorbing their own weight in water, and upon wetting, and with gentle squeezing, release the dispersed additives 22. Further, our pads are stronger and more durable than less dense prior art sponges not containing reinforcing interconnecting strands.

The pad, in its preferred embodiment, is molded In Step 12 of FIG. 1 in a manner that produces a flat surface having hemispherical voids or depressions, although surfaces textured with other shapes or with serrations are suitable. The uniform reacting mixture is poured into a first mold that has been dusted optionally with a fine layer of additional abrasive whose concentration is between 0.25 and 5.0 grams per square inch but which comprises not more than 10% by weight of the final product. A second mold is placed opposite the first mold and proximate to the reacting mixture and normal foaming allowed. The subsequent volumetric expansion that accompanies polyurethane reactions gently pressures the material onto the surfaces of the first and second molds. The mold is open and sidewise expansion permitted. On cooling, a solid polyurethane product having a density between 6 and 30 lbs./ft.$^3$, preferably between 10 and 25 lbs./ft.$^3$, is released from the mold surfaces. Excess surface abrasive is removed by vacuuming and is recycled for subsequent use. The molded polyurethane product is then cut into pads of convenient size, generally $2\frac{1}{2} \times 2\frac{1}{2} \times \frac{3}{4}$ inches.

Figure 3:
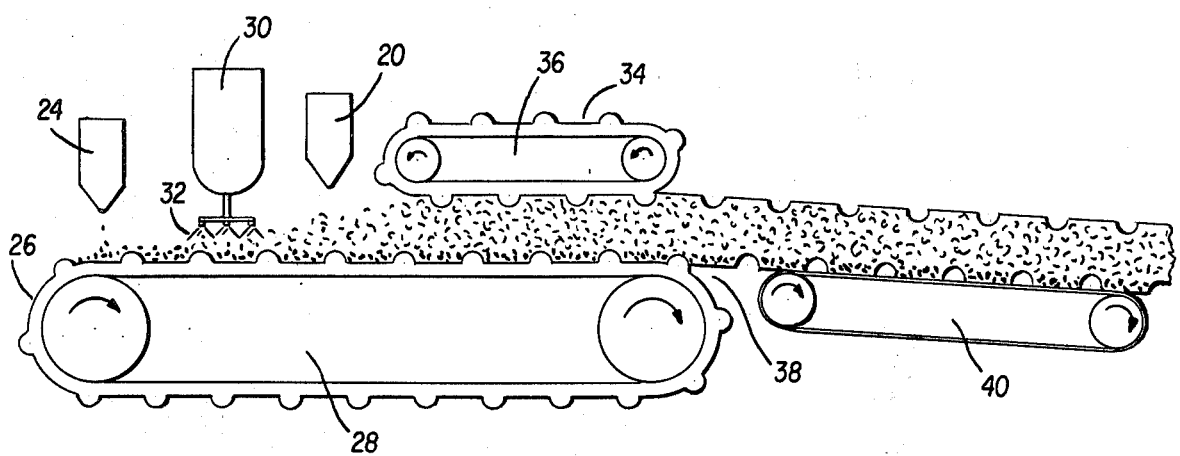
FIG. 3 is a drawing illustrating the preferred continuous method for molding polyurethane cleaning pads of the present invention.

The preferred method of manufacture is continuous and is illustrated schematically in FIG. 3. Abrasive from dispenser 24 is sifted or dusted over lower shaping surface or mold 26 which is also the belt for continuous conveyor 28. As the mold containing the abrasive layer passes under tank 30, reaction mixture containing the additives is dispensed onto the lower mold through distributor 32. While mixture is reacting, the mold travels beneath upper shaping surface or mold 34, which is also the belt for continuous conveyor 36. The now foaming reaction mixture expands against the surfaces of both molds thereby densifying the top and bottom polyurethane surfaces. Reaction is complete as the product leaves end 38 of conveyor 28, and is removed by suitable means such as conveyor 40. The molds then return to their respective original positions. The product may then be vacuumed, trimmed or cut as need be.

This last embodiment wherein an additional layer of abrasive is incorporated into the surface of the pad is also an improvement over the prior art because the abrasives are incorporated uniformly at the surface of the pad where they are most needed. By contacting the reacting mass between two molds an additional densification at the surface of the pad occurs. The first surface to which the abrasive layer has been added is both strong and flexible, yet retains its resilient texture, permitting generation of suds by gentle squeezing. The textured surface of the pad increases the area available for contact with the object to be cleaned and makes scouring a faster and more efficient task. The additional strength at the cleaning surface is especially important since the densified walls of adjoining hemispheres are more capable of withstanding a scrubbing or scouring motion, resulting in a longer lasting pad. If desired, both the first and second surfaces may contain a dense layer of abrasives. This may be accomplished by dusting the reacting mass just prior to placement of the second mold with a second layer of abrasive. In the continuous process of FIG. 1 a pad having a layer of abrasives on both top and bottom surfaces can be obtained by dusting additional abrasive from dispenser 20 onto the top of the reacting mass just before the lower conveyor moves beneath the upper mold. This allows the molded product to be cut longitudinally to produce a pad having a textured first surface of impregnated abrasives, and a second surface wherein the dispersed additives are exposed.

Water soluble additives such as detergent and the ammonia, oxygen or chlorine releasing agents may be encapsulated with a water soluble film forming material selected from a group consisting of hydroxymethyl cellulose, polyvinyl alcohol, polyvinylmethylether, polyacrylamide and polyvinylpyrrolidone prior to mixing with abrasive. The coating is obtained by spraying the additive to be treated with 0.5 to 5% aqueous solution of the film former and allowing the moisture to evaporate therefrom. The coating dissolves slowly thereby releasing the particular additive over a period of time. Alternatively, a pad shredded to between 40 and 100 mesh and containing additives can be mixed with the partially reacted mass at the second mixing stage to encapsulate the additives. While the shredded pad may be prepared specifically for this purpose according to the procedure described above, it is common practice to utilize the scraps from the trimming operation. In addition it is also possible to use both methods of encapsulation together in one pad.

Examples of typical product compositions are given below.

EXAMPLE 1

Per 100 grams of F-202 prepolymer manufactured by Stepan Chemical Company are added 2.5 grams of catalyst comprised of 12.6 % triethylenediamine, 20.8% triethanolamine, and 66.6% water. The mixture is blended at 1000 RPM for 50 seconds at which time the mixture has a creamy texture. To the partially reacted polymeric mass, blend in a previously prepared additive mixture of:

Sulframin 85 Powder, Detergent—40 grams
Pumice, Abrasive—75 grams
Color—0.5 grams Mix the additives and polymer mixture for 35 seconds at 500 RPM. Pour this mixture onto a negatively textured lower mold that has been dusted with 20 grams of pumice. Allow to foam and expand such that the finished product is sandwiched between the upper and lower molds. Upon completion of the reaction, allow the product to gel and set. Release the product and trim to convenient shape and size.

EXAMPLE 2

Ammonia releasing pad. Prepare the prepolymer-catalyst mixture as in Example 1. The ammonia releasing agent is prepared by dry mixing 12.5 grams of ammonium chloride with 5.0 grams of sodium carbonate. This mixture is then added to 30 grams of detergent, and the resulting additive mixture is added to the partially reacted polymeric mass. Mix the additive-polymeric mass mixture for 35 seconds at 500 RPM. Pour into a mold and allow to foam as in Example 1 to obtain an abrasive free cleaning pad from which ammonia is released upon wetting.

EXAMPLE 3

Encapsulation of additives. Prepare the partially reacted polymeric mass as in Example 1. The additive mixture is prepared as follows. Mix 12.5 grams of ammonium chloride with 5.0 grams of sodium carbonate. Spray a 10 gram portion of the ammonia releasing agent with an atomized mist of a 2% aqueous solution of polyvinylpyrrolidone and allow the moisture to evaporate therefrom to obtain a water soluble film over the mixture. In like manner coat 30 grams of Ultrawet K detergent with the film former. Recoat 15 grams of the dried, treated detergent with an additional layer of film. Admix the ammonia releasing agent and the coated and twice coated detergent with an additional 15 grams of untreated detergent and 50 grams of pumice. Mix the combined additive mixture with the polymer mass at 500 RPM for 50 seconds and pour in a mold as in Example 1. The product thus formed releases detergent and ammonia gradually over time as well as releasing the uncoated additives during initial use.

EXAMPLE 4

Oxygen releasing sponge. Same as Example 2 except to the additive mixture include 10.0 grams of sodium perborate in lieu of the ammonia releasing agent.

EXAMPLE 5

This is an example of encapsulation of a portion of the additives using polyurethane foam prepared by the present invention as the encapsulating material.

Step I.

Prepare 100 grams of prepolymer resin and 2.5 grams of catalyst as per example 1. To this add the mixture:

Ultrawet K detergent—30 grams
Sodium Perborate—15 grams

Blend this mixture with the polymeric mass by mixing at 750 RPM for 40 seconds. Pour onto an open mold and allow to foam, set and gel. Shred or chop the finished foam into pieces between 40 and 100 mesh.

Step II

Prepare a second batch of partially reacted polymeric material containing 100 grams of prepolymer resin and 2.5 grams of catalyst as per example 1. To this add 20 grams of encapsulated additives prepared in Step I and mix at 750 RPM for 30 seconds.

Step III

Then add a mixture of the following additives:
Ultrawet K detergent—20 grams
Pumice—30 grams
Sodium Perborate—8 grams
Continue mixing for 35 seconds at 750 RPM. The resulting mixture is poured into a mold as in Example 1 and allowed to rise, gel and set as before. Optionally, 2.0 grams of pumice per square inch could have been dusted onto the surface of the mold.

It should be understood that the foregoing examples are to be construed as illustrative rather than limiting. Wide deviations from these examples may be made without departing from the main theme of invention specified in claims which follow.

We claim:

1. A dry synthetic resilient foamed polyurethane hydrophilic pad produced by reacting a prepolymer urethane resin and an aqueous catalyst mixture, the pad containing an additive selected from the group consisting of abrasives, water soluble detergents, and combinations thereof dispersed uniformly therein in the ratio of between 0.25 to 2.0 parts additive per part prepolymer, and having a densely structured polyurethane cellular matrix of 6 to 30 lbs./ft.$^3$, said matrix comprised of abnormal and normal polyurethane cells, the matrix also containing fibrous polyurethane strands which are interwoven through the abnormal and normal cells as a consequence of the shear forces during mixing, said abnormal cells being ruptured, collapsed, swollen and distorted, said pad being produced by slowly mixing the resin and catalyst mixture to hinder foam formation, thereafter adding the additive and then further mixing to form a uniform reacting mixture prior to allowing volumetric expansion of the mixture.

2. The pad of claim 1 having a first surface textured, and into which first surface a first abrasive layer is embedded, said first abrasive layer being in addition to said additive which is uniformly dispersed in said pad.

3. The pad of claim 2 wherein the abrasive embedded into the first surface is between 0.25 and 5.0 grams per square inch but which comprises not more than 10% by weight of the pad.

4. The pad of claim 3 whose first surface is textured with hemispherical depressions.

5. The pad of claim 3 whose first surface is textured with serrations.

6. The pad of claim 2 having a second surface textured, and into which second surface a second abrasive layer is embedded, said second abrasive layer also being in addition to said additive which is uniformly dispersed in said pad.

7. The pad of claim 6 whose second surface is textured with hemispherical depressions.

8. The pad of claim 6 whose second surface is textured with serrations.

9. The pads of claims 2 or 6 containing an abrasive selected from a group consisting of pumice, silica, aluminum oxide, and volcanic ash.

10. The pads of claim 9 wherein the preferred abrasive is pumice.

11. The pad of claim 1 which also contains a water soluble additive selected from a group consisting of an ammonia releasing agent, a chlorine releasing agent, and an oxygen releasing agent.

12. The pad of claim 11 wherein at least a portion of the water soluble additives are encapsulated to provide release of these additives over a period of time.

13. The pad of claim 11 wherein the encapsulated additives are coated with a water soluble film former selected from a group consisting of polyvinyl alcohol, polyvinylpyrrolidone, hydroxymethyl cellulose, polyvinylmethylether and polyacrylamide.

14. The pad of claim 12 wherein pieces of 40 to 100 mesh shredded foam including said water soluble additives therein are introduced into said mixture.

15. A method for making a dry synthetic resilient foamed polyurethane hydrophilic pad comprising:
mixing a prepolymer urethane resin with an aqueous catalyst mixture at 500 to 2500 RPM for 30 to 100 seconds to obtain a partially polymerized mixture;
adding an additive selected from the group consisting of abrasives, detergents, and combinations thereof to the partially polymerized mixture;
mixing the additives with the partially polymerized mixture before volumetric expansion of the partially polymerized mixture takes place, said mixing occurring at 250 to 750 RPM for 30 to 100 seconds at which time a uniform reacting mixture is obtained;
dispensing the uniform reacting mixture onto a first shaping surface, and
contacting the reacting mixture between a second shaping surface and the first shaping surface so that the volumetric expansion exerts pressure against the shaping surfaces thereby densifying the surfaces of the polyurethane pad.

16. The method of claim 15 further including the step of sifting a layer of abrasive material onto the first shaping surface prior to dispensing said reacting mixture onto said shaping surface and embedding said abrasive material within the lower surface of said pad.

17. The method of claim 15 wherein the shaping surfaces are comprised of continuously moving conveyers and the steps of dispersing the uniform mixture and contacting the mixture with the second shaping surface are performed along the moving conveyors.

18. The method of claim 16 wherein a second layer of additional abrasive is sifted onto the upper surface of the reacting mixture prior to contact of the expanding mass against the second shaping surface, said second shaping surface also having a textured surface.

19. The method of claim 15 wherein an added ingredient selected from a group consisting of fragrances, dyes, sanitizers, polishing agents, ammonia releasing agents, chlorine releasing agents, and oxygen releasing agents and compatible combinations of same are mixed with the abrasive and/or detergent mixture.

20. The method of claim 19 wherein a portion of the added ingredient is coated by spraying with a 0.5 to 5% aqueous solution of a water soluble material selected from a group consisting of hydroxymethylcellulose, polyvinyl alcohol, polyvinylmethylether, polyacrylamide and polyvinylpyrrolidone prior to admixture with other additives, but after evaporation of moisture therefrom.

21. The method of claim 15 wherein the catalyst is comprised of by weight analysis 10 to 15% triethylenediamine, 18 to 22% triethanolamine, and 60 to 70% water.

22. The method of claim 15 wherein the polymeric mass is produced directly from prepolymer precursors and catalyst.

* * * * *